United States Patent
Zeng (10) Patent No.: US 7,336,040 B2
(45) Date of Patent: Feb. 26, 2008

(54) SINGLE-CHANNEL COMPREHENSIVE PROTECTION CIRCUIT

(75) Inventor: Haoran Zeng, Dongyang (CN)

(73) Assignee: Hengdian Tospo Electronics Co. Ltd., Dongyang, Zhejiang Province (CN)

( * ) Notice: Subject to any disclaimer, the term of this patent is extended or adjusted under 35 U.S.C. 154(b) by 0 days.

(21) Appl. No.: 11/545,497

(22) Filed: Oct. 11, 2006

(65) Prior Publication Data
US 2007/0090776 A1 Apr. 26, 2007

(30) Foreign Application Priority Data
Oct. 11, 2005 (CN) ........................ 2005 1 0061046

(51) Int. Cl.
*H05B 37/02* (2006.01)
(52) U.S. Cl. .................. 315/224; 315/226; 315/291; 315/308
(58) Field of Classification Search ............ 315/200 R, 315/205, 209 R, 224, 226, 244, 291, 307 315/308, 361
See application file for complete search history.

(56) References Cited

U.S. PATENT DOCUMENTS 5,608,295 A * 3/1997 Moisin ....................... 315/247
6,051,940 A * 4/2000 Arun .......................... 315/307
6,107,754 A * 8/2000 Kim ........................... 315/291
6,894,437 B2 * 5/2005 Okamoto et al. ....... 315/209 R

* cited by examiner

*Primary Examiner*—Douglas W. Owens
*Assistant Examiner*—Jimmy Vu
(74) *Attorney, Agent, or Firm*—Jacobson Holman PLLC

(57) ABSTRACT

The present invention discloses a single-channel comprehensive protection circuit of a self-excitation half-bridge series resonant circuit having a single lamp output, including a DC block capacitor $C_3$, a first partial pressure resistor $R_1$, a second partial pressure resistor $R_2$, a rectifying diode $D_1$, a filter and integral capacitor $C_4$, a release resistor $R_3$, a diac $D_2$, a filter capacitor $C_5$, a filter resistor $R_4$, wherein the method of one point of loading point A at the fluorescent lamp filament is used. The present invention normalizes the treatment of abnormal signals for over-current, over-voltage and end of lamp life state etc. in order to replace the conventional design of multi-channel and multi-point sampling for simplifying the circuit, reducing the cost and space, increasing reliability, and facilitating miniaturization development of the electronic lighting products. The present invention can be applied in the self-excitation half-bridge series resonant circuit of a single-lamp, the self-excitation half-bridge series resonant circuit of the multi-lamps, the separate-excitation half-bridge series resonant circuit of a single-lamp and the separate-excitation half-bridge series resonant circuit of the multi-lamp.

9 Claims, 10 Drawing Sheets

SINGLE-CHANNEL COMPREHENSIVE PROTECTION CIRCUIT

FIELD OF THE INVENTION

The invention relates to the abnormality protection technology in the electric power, electronic and lighting electronic fields, and in particular to an abnormality protection circuit for an electronic ballast used in a fluorescent lamp.

DESCRIPTION OF THE RELATED ART

In the conventional technology field of electronic ballast, a multi-channel protection circuit is generally used to prevent the electronic ballast from being damaged, when a fluorescent lamp tube is in abnormal conditions, such as over-current, over-voltage, or reaches the end of lamp life, in order to increase the reliability of products and extend the service life of the products.

Conventionally, the abnormal signal of over-current is obtained by serially connected resistors in the main loop of the electronic ballast or by the auxiliary winding of the resonant inductance in the lamp output circuit. When the electronic ballast is overload or when the fluorescent lamp tube leaks or is not activated, the increased current of the main circuit is obtained by the serially connected resistors in the main loop or the auxiliary winding of the resonant inductance. Then the oscillatory output of the circuit shall be stopped for protection purposes. The abnormal signal of over-voltage may be obtained by detecting the voltage of two ends of a lamp tube. When the electronic powder of two ends electric poles of the lamp tube starts to age or the lamp tube leaks slowly, the lamp voltage increases under the condition of the basically invariable lamp current, which makes the lamp power gradually increase. This signal will activate the protection execution circuit by a rectified DC voltage. The rectification state (EOL) of a lamp tube may be obtained from two ends of a feed-through capacitor connected with the lamp tube. When the electronic powder of two ends of the electric poles of the lamp tube ages and becomes asymmetry, the rectification effect can appear in the lamp voltage. This signal activates the protection execution circuit by means of the logical level obtained by a window comparator or other circuits.

In the conventional technology (see FIG. 1), although the product reliability can be increased by using a multi-channel protection circuit, the technical design of the multi-channel protection circuit also brings the following drawbacks: 1. The integral reliability is reduced due to its complex circuits; 2. The cost increases due to its complex circuits; 3. The efforts to minimize product is affected due to its complex circuits and additional components.

SUMMARY OF THE INVENTION

The present invention is provided to solve the problems of reduced reliability, increased cost and volume etc., caused by the multi-channel detection protection circuit used in conventional technology. Through the signal sampling treatment at the same point, the detection and control for over-current, over-voltage and rectification state signal of the lamp can be achieved at the same time in order to increase the reliability, reduce cost and the volume of products.

The new technical solution to solve the above-mentioned problems is a single-channel comprehensive protection circuit of self-excitation half-bridge series resonant circuit having a single-lamp output, including a DC block capacitor $C_3$, a first partial pressure resistor $R_1$, a second partial pressure resistor $R_2$, a rectifying diode $D_1$, a filter and integral capacitor $C_4$, a release resistor $R_3$, a diac $D_2$, a filter capacitor $C_5$, a filter resistor $R_4$, a thyristor SCR, a clamping diode $D_3$ and a control winding $T_{1D}$; characterized in that one end of the DC block capacitor $C_3$ is connected with the first partial pressure resistor $R_1$, and the other end of the DC block capacitor is connected with a loading point A of one end of a fluorescent lamp filament; the other end of the filament is connected with a resonant inductance L; one end of the second partial pressure resistor $R_2$ is connected with the other end of the first partial pressure resistor $R_1$ and the anode of rectifying diode $D_1$, and the other end of the second partial pressure resistor $R_2$ is connected with a common ground point D; the cathode of the rectifying diode $D_1$ is connected with the ends of the filter and integral capacitor $C_4$, the release resistor $R_3$, and the diac $D_2$, respectively. The other ends of the filter and integral capacitor $C_4$, and the release resistor $R_3$ are connected with a common ground point D. The other end of the diac $D_2$ is connected with the ends of the filter capacitor $C_5$, the filter resistor $R_4$, the control pole of the thyristor SCR. The other ends of the filter capacitor $C_5$, the filter resistor $R_4$, and the cathode of the thyristor SCR are also connected with a common ground point D. The anode of the thyristor SCR is connected with the cathode of the clamping diode $D_3$, and then is connected with a power supply end $V_{DC}$ by a resistor $R_5$. The anode of the clamping diode $D_3$ is connected with one end of the control winding $T_{1D}$ of an oscillatory coil of a self-excitation half-bridge series resonant circuit. The other end of the control winding $T_{1D}$ is connected with a common ground point D.

In the protection circuit of the present invention, the abnormal signal single-channel sampling loop is composed of a DC block capacitor $C_3$, a first partial pressure resistor $R_1$ and a second partial pressure resistor $R_2$ in series which is parallel between a loading point A of one end of a filament and a common ground point D. Through DC block capacitor $C_3$, the abnormal signal shall be applied to pressure a divider formed by the first partial pressure resistor $R_1$ and the second partial pressure resistor $R_2$. The rectification diode $D_1$, the filter and integral capacitor $C_4$, and the release resistor $R_3$ are formed into a half-wave peak filter to fulfill the treatment of the pressure divider signal from the first partial pressure resistor $R_1$ and the second partial pressure resistor $R_2$. At the same time, the first partial pressure resistor $R_1$ and the filter and integral capacitor $C_4$ are also formed into an integral circuit so as to ensure the sending of protective signal on the electronic ballast after preheating starts. The release resistor $R_3$ provides the discharge loop of the filter and integral capacitor $C_4$. The diac $D_2$ completes its control over the quality of abnormality signals. When the abnormality signal reaches the pre-determined value, the diac $D_2$ outputs the voltage to the control pole of a thyristor SCR and activates it to be conductive. The filter resistor $R_4$ and a filter capacitor $C_5$ form a filter network to avoid the wrong action of the thyristor SCR. The clamping diode $D_3$ shall short circuit the control winding $T_{1D}$ when the thyristor SCR turns on in order to stop the actuation of two oscillatory windings $T_{1B}$ and $T_{1C}$ of the self-excitation half-bridge series resonant circuit, thus completing the protective action.

According to the present invention, the control winding $T_{1D}$ is used to control two oscillatory windings $T_{1B}$ and $T_{1C}$ of the self-excitation half-bridge series resonant circuit to stop oscillating after normalizing the abnormal signals of over-current, over-voltage and lamp rectification state from the lamp output circuit to fulfill the protective action.

The theoretical principle of the present invention is further described in more detail by reference to the attached drawings.

As a further improvement according to the present invention, the control winding $T_{1D}$ is conjugated with the two oscillatory windings $T_{1B}$ and $T_{1C}$ of the self-excitation half-bridge series resonant circuit. The control winding $T_{1D}$ shall be an auxiliary winding of the mentioned the two oscillatory windings $T_{1B}$ and $T_{1C}$ of the self-excitation half-bridge series resonant circuit.

Furthermore, the present invention provides a single-channel comprehensive protection circuit for a self-excitation half-bridge series resonant circuit having a multi-lamps output, which includes many sampling circuit units of similar structures and corresponding multiple rectifying diodes. Each of the sampling circuit units includes one DC block capacitor and two partial pressure resistors, characterized in that one end of the DC block capacitor is connected with the first partial pressure resistor, and other end of the DC block capacitor is connected with the loading point of one end of a fluorescent light filament. The other end of the filament is connected with a resonant inductance. The end of the second partial pressure resistor is connected with the other end of the first partial pressure resistor and the anode of the corresponding rectifying diode. The other end of the second partial pressure resistor is connected with a common ground point D. The cathode of the rectifying diode is connected with the ends of a filter and integral capacitor $C_4$, a release resistor $R_3$, and a diac $D_2$. The other ends of the filter and integral capacitor $C_4$ and the release resistor $R_3$ are connected with a common ground point D. The other end of the diac $D_2$ is connected with the ends of the filter capacitor $C_5$, a filter resistor $R_4$, and the control pole of a thyristor SCR. The other ends of filter capacitor $C_5$, the filter resistor $R_4$, and the cathode of the thyristor SCR are also connected with a common ground point D. The anode of the thyristor SCR is first connected with the cathode of a clamping diode $D_3$, then connected with a power supply end $V_{DC}$ through a resistor $R_5$. The anode of the clamping diode $D_3$ is connected with one end of the control winding $T_{1D}$ of an oscillatory coil of the self-excitation half-bridge series resonant circuit. The other end of control winding $T_{1D}$ is connected with a common ground point D.

The theory of the above design is the same as the single-channel comprehensive protection circuit of a self-excitation half-bridge series resonant circuit having a single-lamp output. So long as the abnormal situation exists at any lamp tube, the protection circuit will make immediately after the corresponding sampling circuit unit receives this abnormal signal.

The present invention provides a single-channel comprehensive protection circuit of a separate-excitation half-bridge series resonant circuit of a single-lamp output, including a DC block capacitor $C_3$, a first partial pressure resistor $R_1$, a second partial pressure resistor $R_2$, a rectifying diode $D_1$, a filter and integral capacitor $C_4$, a release resistor $R_3$, a diac $D_2$, a filter capacitor $C_5$ and a filter resistor $R_4$, characterized in that one end of the DC block capacitor is connected with the first partial pressure resistor $R_1$, and the other end of the DC block capacitor $C_3$ is connected with a loading point A at one end of the fluorescent light filament. The other end of the filament is connected with a resonant inductance L. One end of the second partial pressure resistor $R_2$ is connected with the other end of the first partial pressure resistor $R_1$ and the anode of the rectifying diode $D_1$. The other end of the second partial pressure resistor $R_2$ is connected with a common ground point D. The cathode of the rectifying diode $D_1$ is connected with the ends of the filter and integral capacitor $C_4$, the release resistor $R_3$, and the diac $D_2$, respectively. The other ends of the filter and integral capacitor $C_4$ and release resistor $R_3$ are connected with the common ground point D. The other end of diac $D_2$ is connected with the filter capacitor $C_5$, the filter resistor $R_4$, the selected end CS of the separate-excitation half-bridge series resonant circuit of the drive chip. The other end of the filter capacitor $C_5$ and the filter resistor $R_4$ are also connected with the common ground point D.

In the protection circuit of the present invention, the abnormal signal single-channel sampling loop is composed of a DC block capacitor $C_3$, a first partial pressure resistor $R_1$ and a second partial pressure resistor $R_2$ in series connection, and then connected parallel between the loading point A of one end of the filament and the common ground point D. Through the DC block capacitor $C_3$, the abnormal signal is applied to pressure a divider formed by the first partial pressure resistor $R_1$ and the second partial pressure resistor $R_2$. The rectifying diode $D_1$, the filter and integral capacitor $C_4$, and the release resistor $R_3$ form a half-wave peak filter to process the pressure divider signal from the first partial pressure resistor $R_1$ and second partial pressure resistor $R_2$. At the same time, the first partial pressure resistor $R_1$ and the filter and integral capacitor $C_4$ form an integral circuit to ensure the sending of protective signal after the preheating start of the electronic ballast. The release resistor $R_3$ supplies the discharge loop of the filter and integral capacitor $C_4$. The diac $D_2$ completes the control of abnormal signal quantity. When the abnormal signal reaches the set value, it outputs the voltage to the selected end CS of a separate-excitation half-bridge series resonant circuit of the drive chip IC and the drive chip IC stops the drive output.

Furthermore, the present invention provides a single-channel comprehensive protection circuit of a separate-excitation half-bridge series resonant circuit having a multi-lamp output, which includes many sampling circuit units of similar structures and their corresponding multi-rectifying diodes. Each of the sampling circuit units includes one DC block capacitor and two partial pressure resistors. The characteristics of the circuit are that one end of the DC block capacitor is connected with a first partial pressure resistor, and the other end of the capacitor is connected with a loading point of one end of the fluorescent lamp filament. The other end of the filament is connected with a resonant inductance. An end of the second partial pressure resistor is connected with the other end of the first partial pressure resistor and the anode of the rectifying diode. The end of the second partial pressure resistor is connected with a common ground point D. The cathode of the rectifying diode is connected with the ends of a filter and integral capacitor $C_4$, a release resistor $R_3$, a diac $D_2$, respectively. The other ends of the filter and integral capacitor $C_4$ and the release resistor $R_3$ are connected with a common ground point D. The other end of the diac $D_2$ is connected with a filter capacitor $C_5$, a filter resistor $R_4$, and the selected end SC of drive chip IC for a separate-excitation half-bridge series resonant circuit, respectively. The other end of the filter capacitor $C_5$ and the filter resistor $R_4$ is connected with a common ground point D.

The theory of the above design is the same as a single-channel comprehensive circuit of a separate-excitation half-bridge series resonant circuit of a single-lamp output. If the abnormal situation exists at any lamp tube, the protection circuit respond immediately after the corresponding sampling circuit unit receives this abnormal signal.

BRIEF DESCRIPTION OF THE DRAWINGS

The invention shall be further described in combination with the attached drawings and practice examples.

DETAILED DESCRIPTION OF THE INVENTION

Figure 1:
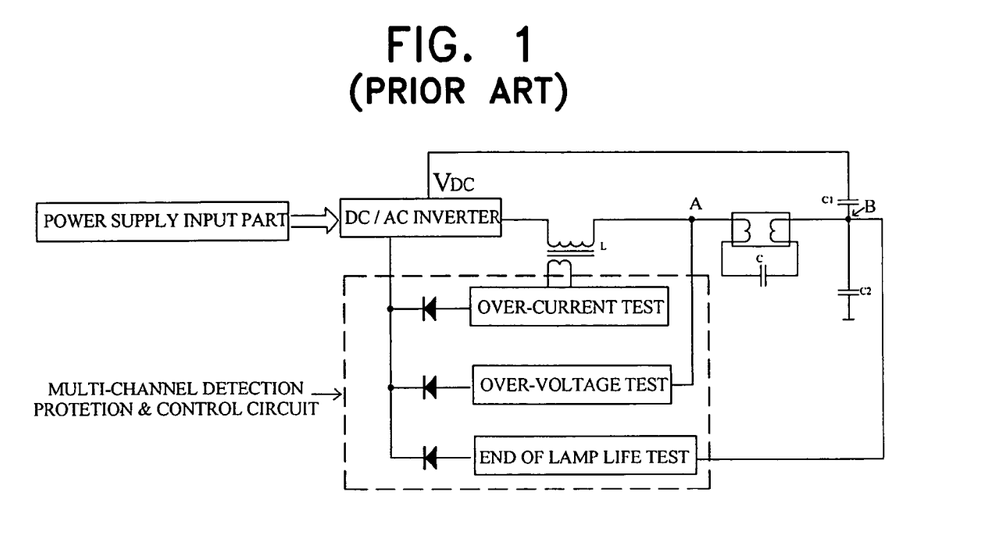
FIG. 1 is a block diagram of an electronic ballast of an existing protection circuit.

FIG. 1 shows a block diagram of an electronic ballast of an existing protection circuit. It consists of a power supply input part, a DC/AC inverter, a lamp output part and a multi-channel detection protection and control circuit. The multi-channel, detection protection and control circuit includes an over-current detection circuit, an over-voltage detection circuit and an end of lamp life detection circuit. Each of the detection circuits takes a sample at different sampling points. Therefore, the circuit is very complex. These have been mentioned in previous paragraphs and will not be repeated again.

Figure 2:
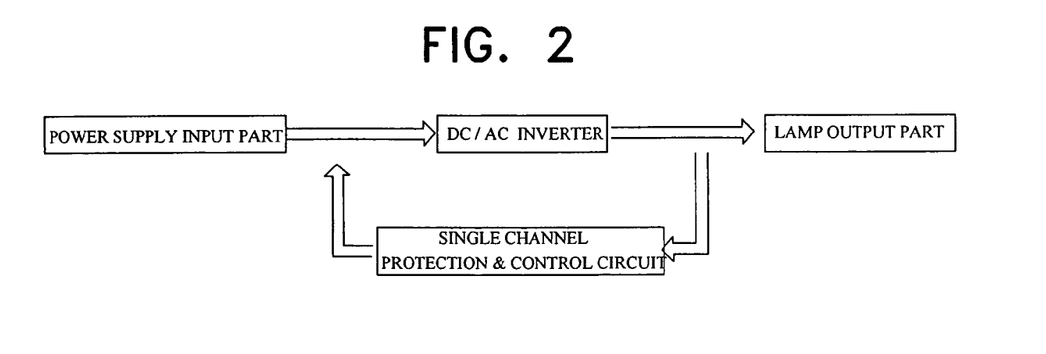
FIG. 2 is a block diagram of an electronic ballast of a single-channel protection circuit according to the present invention.

FIG. 2 shows the block diagram of an electronic ballast of a single-channel protection and control circuit of the present invention. It consists of a power supply input part, a DC/AC inverter, a lamp output part and a single-channel protection and control circuit. The power supply input part generally has a DC output by means of a filter for eliminating high frequency electromagnetic interference and a rectification circuit and filter circuit. A passive or active power factor calibrating circuit may also be added. The DC/AC inverter transforms a DC voltage from the power supply input circuit into a high frequency AC voltage. The lamp output part drives fluorescent lamp by the high frequency AC square wave voltage from the DC/AC inverter through a LC resonance. The single-channel protection and control circuit is designed for increasing the reliability of the electronic ballast to ensure that the electronic ballast is not damaged under the abnormal condition.

Figure 3:
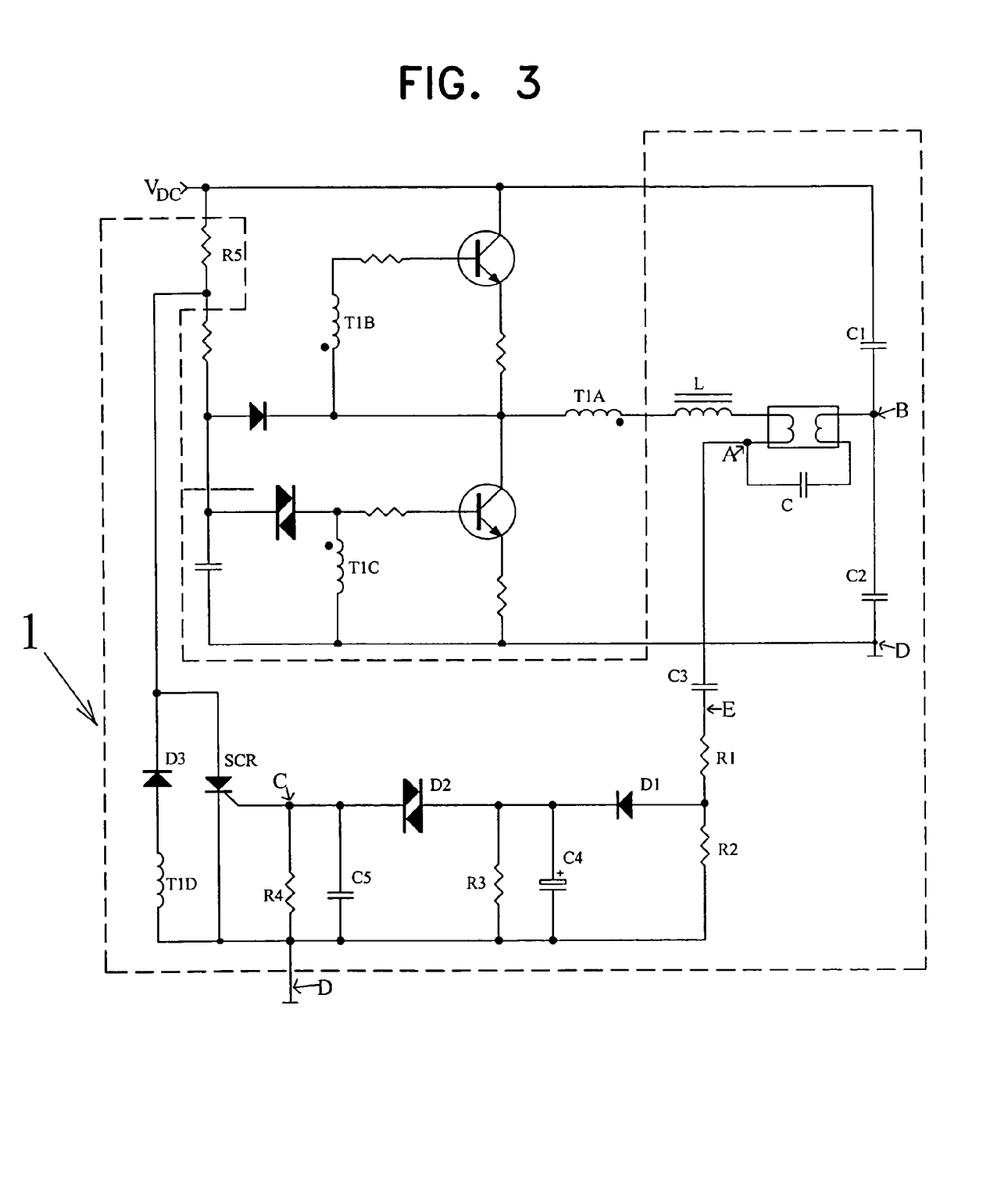
FIG. 3 is a schematic diagram of a self-excitation half-bridge series resonant circuit according to the present invention.

FIG. 3 shows a single-channel comprehensive protection circuit of a self-excitation half-bridge series resonant circuit having a single-lamp output, which includes a DC block capacitor $C_3$, a first partial pressure resistor $R_1$, a second partial pressure resistor $R_2$, a rectifying diode $D_1$, a filter and integral capacitor $C_4$, a release resistor $R_3$, a diac $D_2$, a filter capacitor $C_5$ and a filter resistor $R_4$, a thyristor SCR, a clamping diode $D_3$ and a control winding $T_{1D}$. One end of the DC block capacitor $C_3$ is connected with the first partial pressure resistor $R_1$, and its other end is connected with a loading point A of the fluorescent lamp filament. The other end of the filament is connected with a resonant inductance L. One end of the second partial pressure resistor $R_2$ is connected with the other ends of the first partial pressure resistor $R_1$ and the anode of rectifying diode $D_1$. The other end of the second partial pressure resistor $R_2$ is connected with a common ground point D. The cathode of the rectifying diode $D_1$ is connected with the ends of the filter and integral capacitor $C_4$, the release resistor $R_3$, and the diac $D_2$, respectively. The other ends of the filter and integral capacitor $C_4$, and the release resistor $R_3$ are connected with a common ground point D. The other end of the diac $D_2$ is connected with one ends of the filter capacitor $C_5$, the filter resistor $R_4$, the control pole of a thyristor SCR, respectively. Other ends of the filter capacitor $C_5$ and filter resistor $R_4$ and the cathode of the thyristor SCR are connected with a common ground point D. The anode of the thyristor SCR is connected with the cathode of the clamping diode $D_3$, and then is connected with the power supply end $V_{DC}$ by resistor $R_5$. The anode of the clamping diode $D_3$ is connected with one end of the control winding $T_{1D}$ of an oscillatory coil of the self-excitation half-bridge series resonant circuit. The other end of the control winding $T_{1D}$ is connected with a common ground point D. The control winding $T_{1D}$ is the secondary winding of the oscillatory coil $T_{1B}$ and $T_{1C}$ of the self-excitation half-bridge series resonant circuit.

Figure 4:
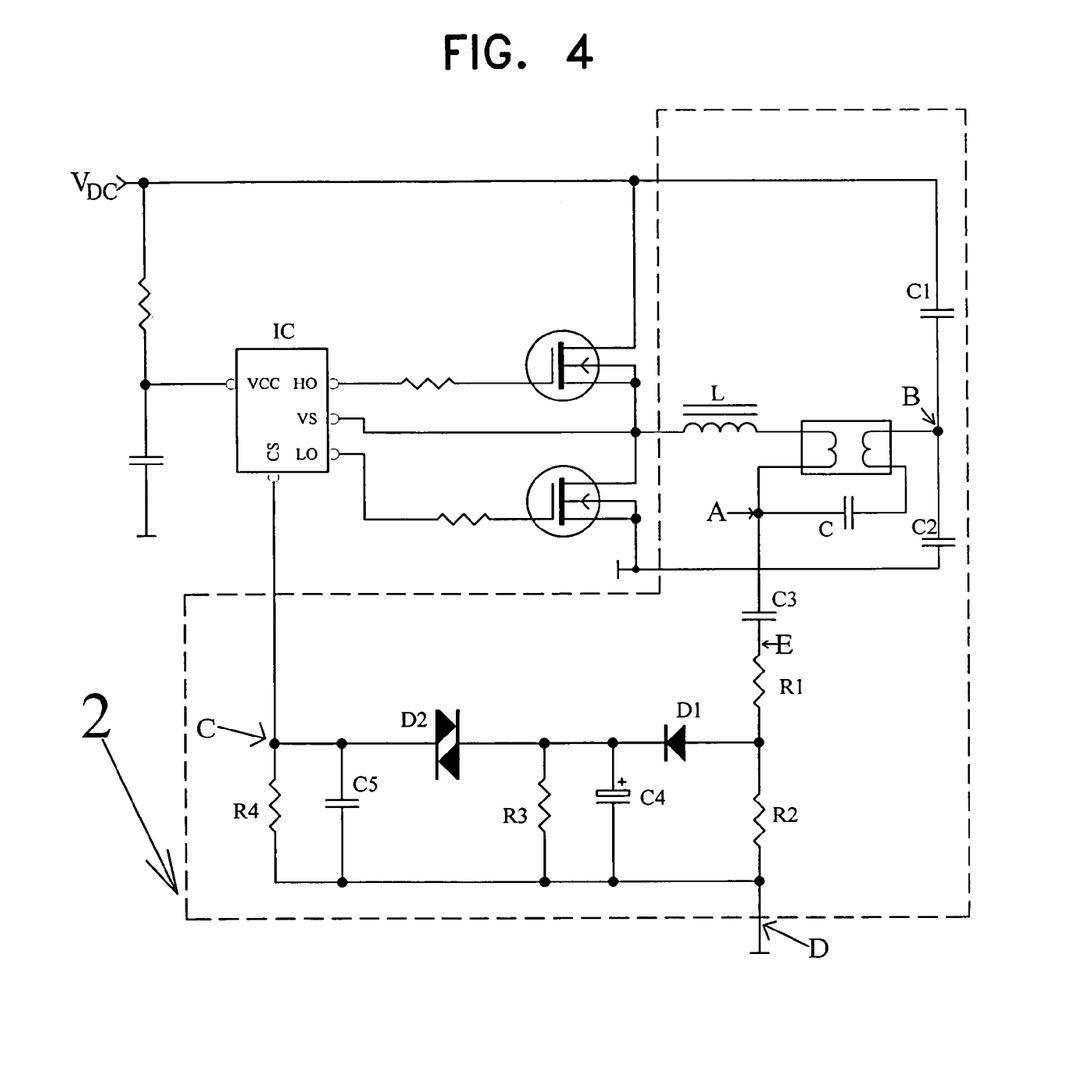
FIG. 4 is a schematic diagram of separate-excitation half-bridge series resonant circuit according to the present invention.

FIG. 4 shows a single-channel comprehensive protection circuit of a separate-excitation half-bridge series resonant circuit having a single-lamp output, including a DC block capacitor $C_3$, a first partial pressure resistor $R_1$, a second partial pressure resistor $R_2$, a rectifying diode $D_1$, a filter and integral capacitor $C_4$, a release resistor $R_3$, a diac $D_2$, a filter capacitor $C_5$ and a filter resistor $R_4$, characterized in that one end of the DC block capacitor $C_3$ is connected with the first partial pressure resistor $R_1$, and the other end of the capacitor is connected with a loading point A at one end of the fluorescent lamp filament. The other end of the filament is connected with a resonant inductance L. One end of the second partial pressure resistor $R_2$ is connected with the other end of the first partial pressure resistor $R_1$ and the anode of the rectifying diode $D_1$. The other end of the second partial pressure resistor $R_2$ is connected with a common ground point D. The cathode of the rectifying diode $D_1$ is connected with the ends of the filter and integral capacitor $C_4$, the release resistor $R_3$, the diac $D_2$, respectively. The other ends of the filter and integral capacitor $C_4$, and the release resistor $R_3$ are connected with a common ground point D. The other end of the diac $D_2$ is connected with the filter capacitor $C_5$, the filter resistor $R_4$, a selected end CS of the separate-excitation half-bridge series resonant circuit of a drive chip, respectively. The other end of filter capacitor $C_5$ and the filter resistor $R_4$ are also connected with the common ground point D.

Figure 5:
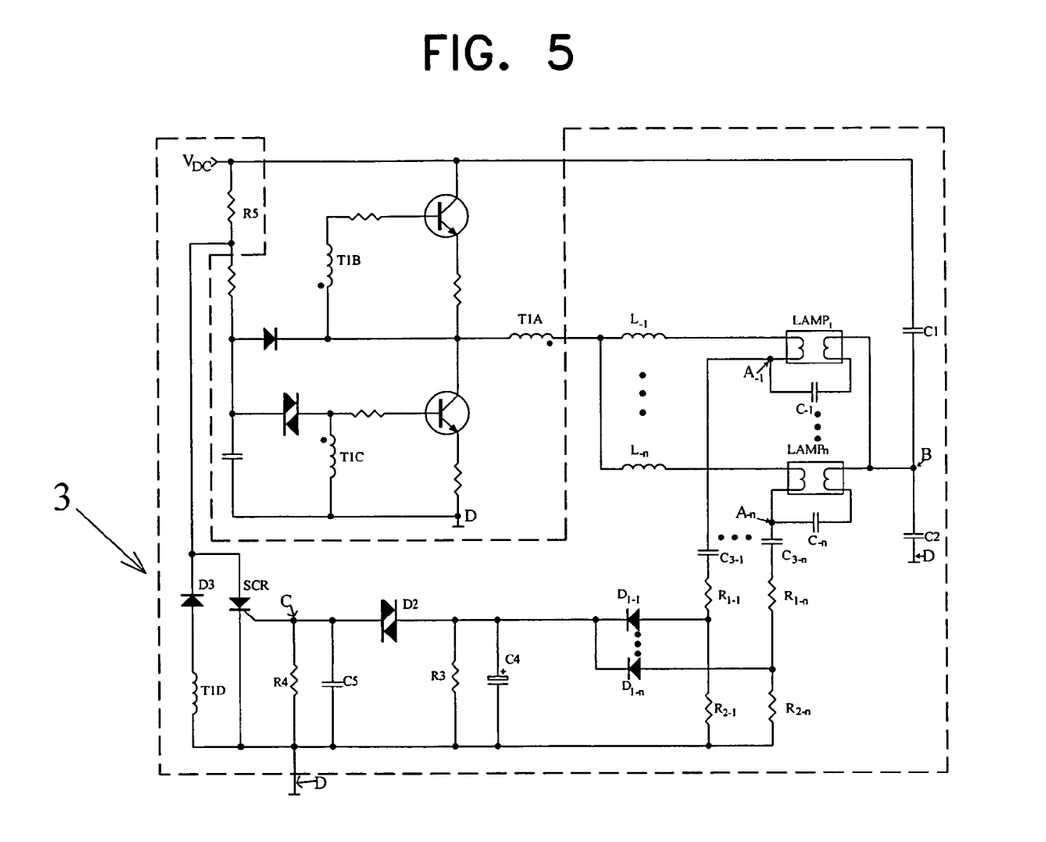
FIG. 5 is a schematic diagram of a self-excitation half-bridge series resonant circuit of multi-lamp according to the present invention.

FIG. 5 shows a single-channel comprehensive protection circuit of a self-excitation half-bridge series resonant circuit having a multi-lamp output, including many sampling circuit units of similar structures and their corresponding multi-rectifying diodes $D_{1-1}$, $D_{1-2}$, ..., $D_{1-n}$. Each of the sampling circuit units includes one DC block capacitors $C_{3-1}$, $C_{3-2}$, ..., $C_{3-n}$ and two partial pressure resistors. The ends of the DC block capacitors $C_{3-1}$, $C_{3-2}$, ..., $C_{3-n}$ are connected with the first partial pressure resistors $R_{1-1}$, $R_{1-2}$, ..., $R_{1-n}$, and their other ends of the capacitors are connected with loading points $A_{-1}$, $A_{-2}$, ..., $A_{-n}$ of one end of the relevant fluorescent lamp filament. The other end of the filament is connected with corresponding resonant inductances $L_{-1}$, $L_{-2}$, ..., $L_{-n}$. The ends of the second partial pressure resistors $R_{2-1}$, $R_{2-2}$, ..., $R_{2-n}$ are connected with the other ends of the first partial pressure resistors $R_{1-1}$, $R_{1-2}$, ..., $R_{1-n}$ and corresponding anodes of the rectifying diode $D_{1-1}$, $D_{1-2}$, ..., $D_{1-n}$ and their other ends are connected with a common ground point D. The cathodes of the rectifying diodes $D_{1-1}$, $D_{1-2}$, ..., $D_{1-n}$ are connected with ends of the filter and integral capacitor $C_4$, and the release resistor $R_3$, the diac $D_2$, respectively. The other ends of the filter and integral capacitor $C_4$ and the release resistor $R_3$ are connected with a common ground point D. The other end of the diac $D_2$ is connected with the filter capacitor $C_5$, the filter resistor $R_4$, and the control pole of the thyristor SCR, respectively. The other ends of the filter capacitor $C_5$, the filter resistor $R_4$, and the cathode of the thyristor SCR are also connected with a common ground point D. The anode of the thyristor SCR is connected with the cathode of the clamping diode $D_3$, and then is connected with a power supply end $V_{DC}$ through the resistor $R_5$. The anode of the clamping diode $D_3$ is connected with one end of the control winding $T_{1D}$ of an oscillatory coil of a self-excitation half-bridge series resonant circuit. The other end of the control winding $T_{1D}$ is connected with a common ground point D. The control winding $T_{1D}$ is the secondary winding of the oscillatory coil $T_{1B}$ and $T_{1C}$ of the self-excitation half-bridge series resonant circuit.

Figure 6:
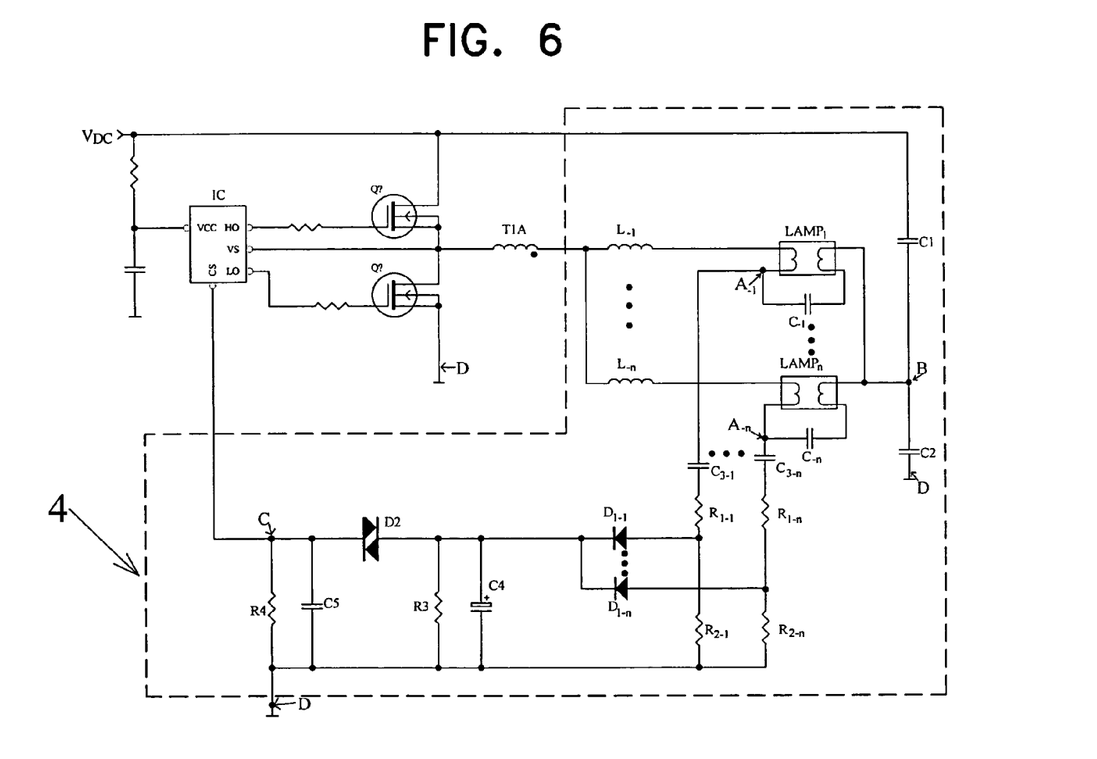
FIG. 6 is a schematic drawing of a separate-excitation series resonant circuit of a multi-lamp according to the prevent invention.

FIG. 6 shows a single-channel comprehensive protection circuit of a separate-excitation half-bridge series resonant circuit of a multi-lamp output, including many sampling circuit units of similar structures and their corresponding multi-rectifying diodes $D_{1-1}$, $D_{1-2}$, ..., $D_{1-n}$. Each of the sampling circuit units includes one DC block capacitors $C_{3-1}$, $C_{3-2}$, ..., $C_{3-n}$ and two partial pressure resistors. The ends of the DC block capacitors $C_{3-1}$, $C_{3-2}$, ..., $C_{3-n}$ are connected with the first partial pressure resistors $R_{1-1}$, $R_{1-2}$, ..., $R_{1-n}$, and the other ends are connected with loading points $A_{-1}$, $A_{-2}$, ..., $A_{-n}$ of one end of a relevant fluorescent lamp filament. The other end of the filament is connected with corresponding resonant inductances $L_{-1}$, $L_{-2}$, ..., $L_{-n}$. The ends of the second partial pressure resistors $R_{2-1}$, $R_{2-2}$, ..., $R_{2-n}$ are connected with the other ends of the first partial pressure resistors $R_{1-1}$, $R_{1-2}$, ..., $R_{1-n}$ and corresponding the anodes of the rectifying diodes $D_{1-1}$, $D_{1-2}$, ..., $D_{1-n}$ and the other ends of the second partial pressure resistors are connected with a common ground point D. The cathodes of the rectifying diodes $D_{1-1}$, $D_{1-2}$, ..., $D_{1-n}$ are connected with the ends of the filter and integral capacitor $C_4$, the release resistor $R_3$, and the diac $D_2$, respectively. The other ends of the filter and integral capacitor $C_4$ and the release resistor $R_3$ are connected with a common ground point D. The other end of the diac $D_2$ is connected with the filter capacitor $C_5$, the filter resistor $R_4$ and the selected end CS of a separate-excitation half-bridge series resonant circuit of a drive chip, respectively. The other ends of the filter capacitor $C_5$ and the filter resistor $R_4$ are connected with a common ground point D.

The present invention integrally processes the abnormal signals for over-current, over-voltage from a lamp output circuit and end of lamp life state by using a loading point A at one end of the filament as the integral sampling point for abnormal signals, and controlling two oscillatory windings $T_{1B}$ and $T_{1C}$ of the self-excitation half-bridge series resonant circuit through controlling winding $T_{1D}$ to stop oscillation or controlling a selected end CS of a drive chip IC for a separate-excitation half-bridge series resonant circuit to make the drive chip IC stop oscillating output in order to complete protection action.

Figure 7:
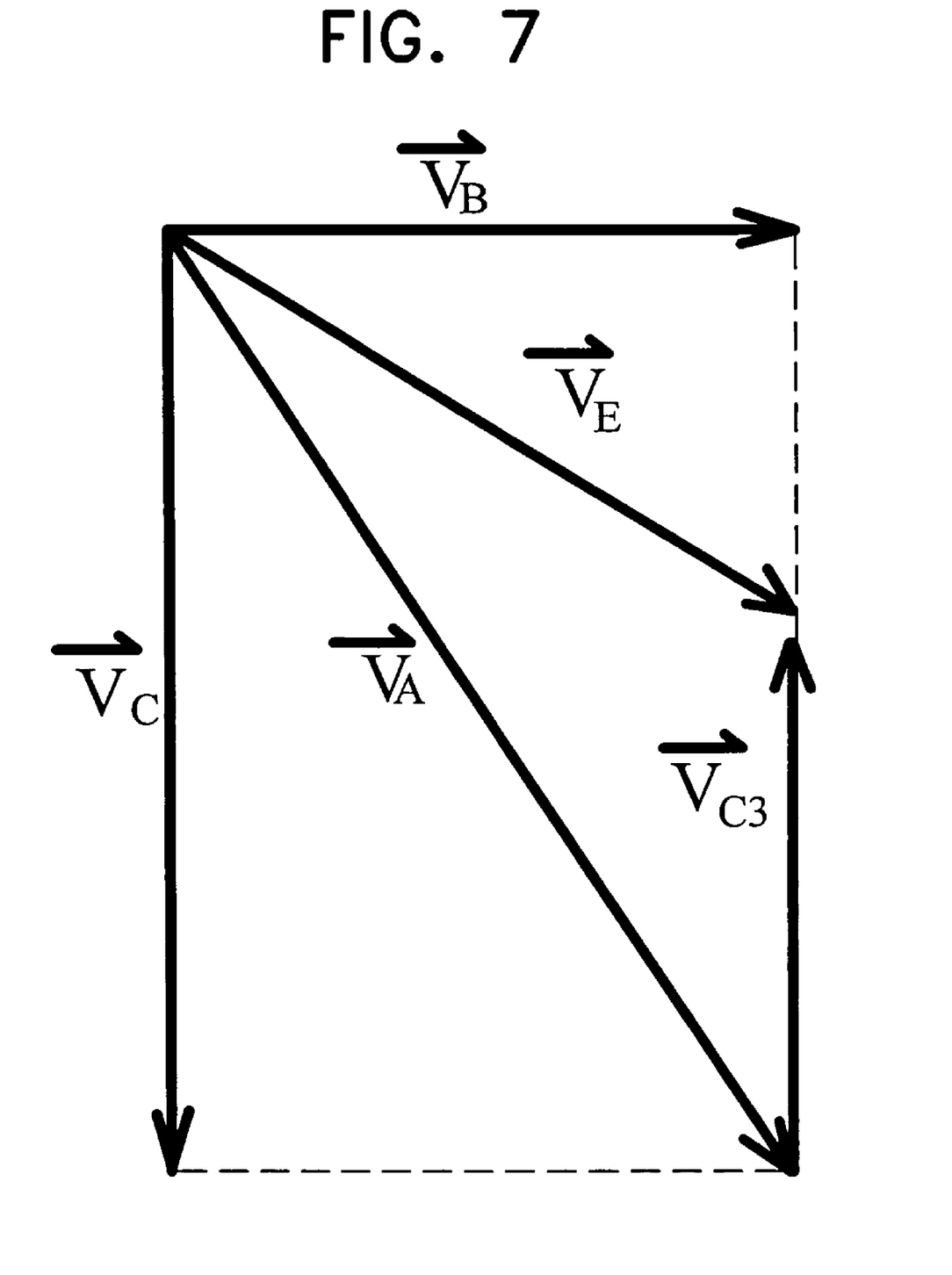
FIG. 7 is a potential vector diagram of relevant points of lamp output circuit of the present invention.
Figure 8:
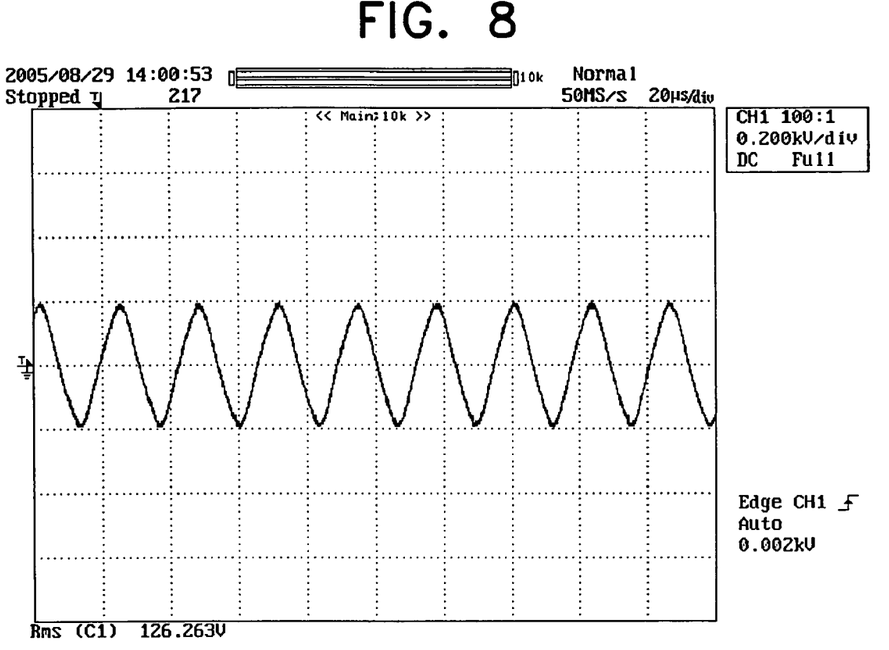
FIG. 8 is a wave-form diagram of stationary lamp voltage $V_C$ of the present invention.

The principle based on a loading point A at one end of filament as an integral sampling point for abnormal signal is described in theory by reference to FIG. 7.

In FIG. 7, the meaning of various symbols are follows:

$\rightarrow$: Potential vector of B point to ground $\rightarrow$: Potential vector of A point to ground $\rightarrow$: Potential vector of two ends of lamp tube $\rightarrow$: Potential vector of E point to ground $\rightarrow$: Potential vector of two ends of DC block capacitor $C_3$ Evidently: $V_E^2 = V_B^2 + (V_C - V_{C3})^2$ (1)

$V_C^2 = V_A^2 - V_B^2$ (2)

Assume $|\vec{V_E}| = |\vec{V_C}|$

Then: $V_{C3} = V_C - \sqrt{V_C^2 - V_B^2}$ (3)

By (1) and (2), it can be obtained that $V_B^2 + (V_C - V_{C3})^2 = V_A^2 - V_B^2$ (4)

In order to prove that formula (4) is correct, it is extended as follows:

$V_B^2 + V_C^2 - 2V_C*V_{C3} + V_{C3}^2 = V_A^2 - V_B^2$ (5)

(2) and (3) are added into (5) to obtain $V_B^2 = 2\sqrt{V_A^2 - V_B^2} * \left(\sqrt{V_A^2 - V_B^2} - \sqrt{V_A^2 - 2V_B^2}\right) -$ $\left(\sqrt{V_A^2 - V_B^2} - \sqrt{V_A^2 - 2V_B^2}\right)^2 \Leftrightarrow V_B^2 =$ $2\sqrt{V_A^2 - V_B^2} * \left(\sqrt{V_A^2 - V_B^2} - \sqrt{V_A^2 - 2V_B^2}\right) -$ $\left(V_A^2 - V_B^2 + V_A^2 - 2V_B^2 - 2\sqrt{V_A^2 - V_B^2} * \sqrt{V_A^2 - 2V_B^2}\right) \Leftrightarrow V_B^2 =$ $2V_A^2 - 2V_B^2 - 2\sqrt{V_A^2 - V_B^2} * \sqrt{V_A^2 - 2V_B^2} - 2V_A^2 + 3V_B^2 +$ $2\sqrt{V_A^2 - V_B^2} * \sqrt{V_A^2 - 2V_B^2} \Rightarrow$ Left = right $\Rightarrow |\vec{V_E}| = |\vec{V_C}|$.

Therefore, the original assumption is correct. The above proves that $$|\vec{V_E}| = |\vec{V_C}|$$

Therefore, by a single-channel comprehensive sampling of A point as shown in FIG. 3 or FIG. 4, the E point voltage in the circuit is the voltage of two ends of lamp tube.

The expression of the point E voltage after the current goes through the voltage divider is as follows:

$$V_{R2} = V_E * R_1 / (R_1 + R_2)$$

The expression of the voltage after the current goes through the peak value filter formed by $D_1$, $C_4$ and $R_3$ is as follows:

$$V_{C4} = \sqrt{2}\, V_{R2}$$
$$= \sqrt{2}\, V_E * R_1 / (R_1 + R_2)$$

Because $V_C$ lamp tube voltage=$V_E$

So $V_{C4} = \sqrt{2} * R_1/(R_1+R_2) * V_C$

Figure 9:
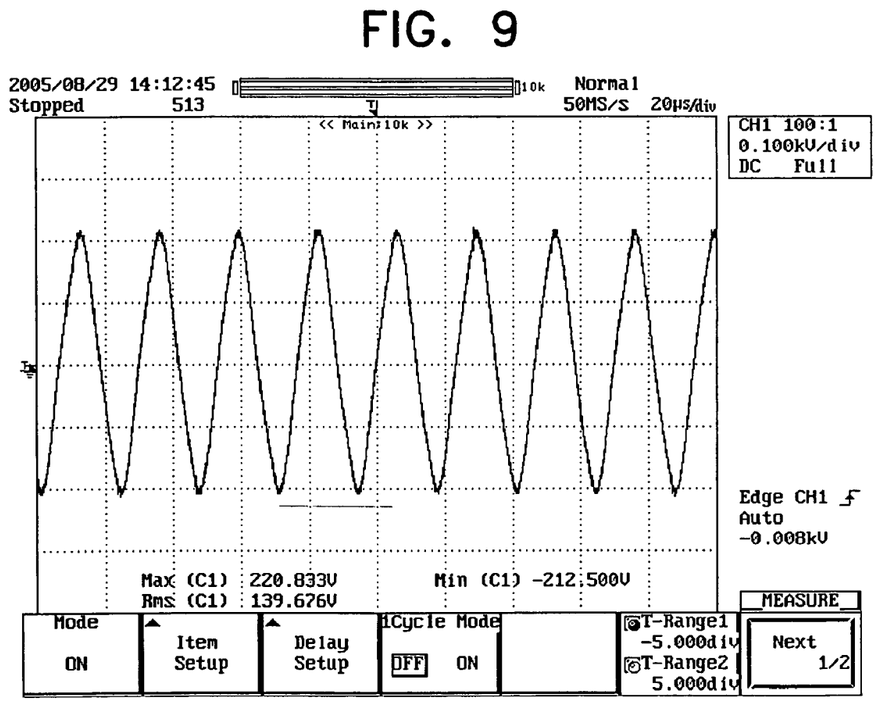
FIG. 9 is a wave-form diagram of stationary voltage $V_E$ of the present invention.
Figure 10:
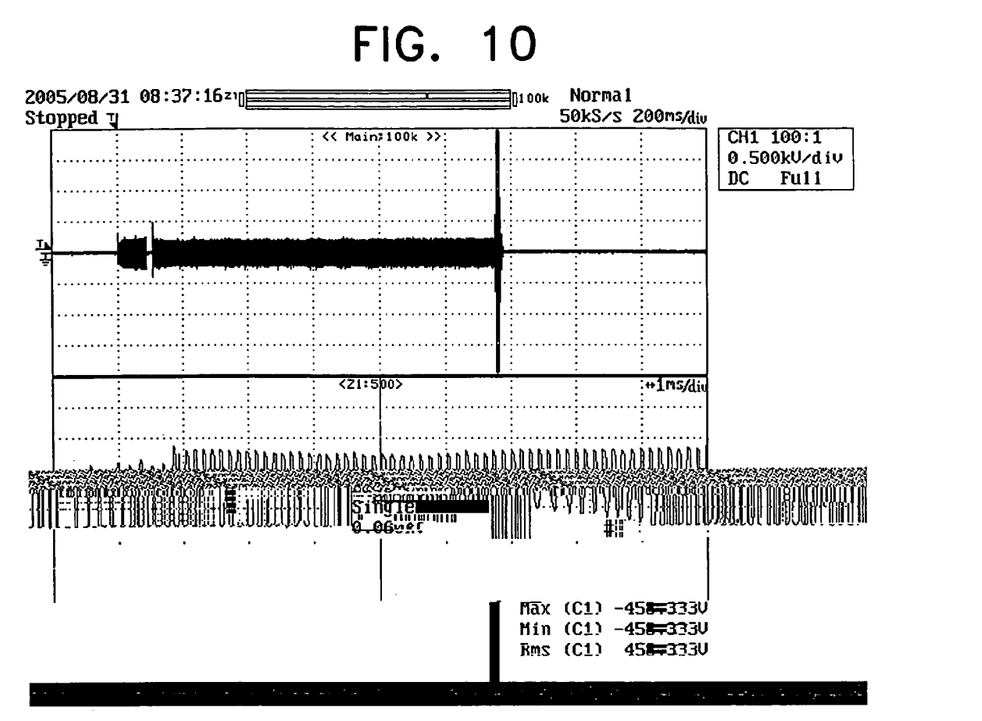
FIG. 10 is a wave-form diagram of leakage voltage $V_E$ of the present invention.
Figure 14:
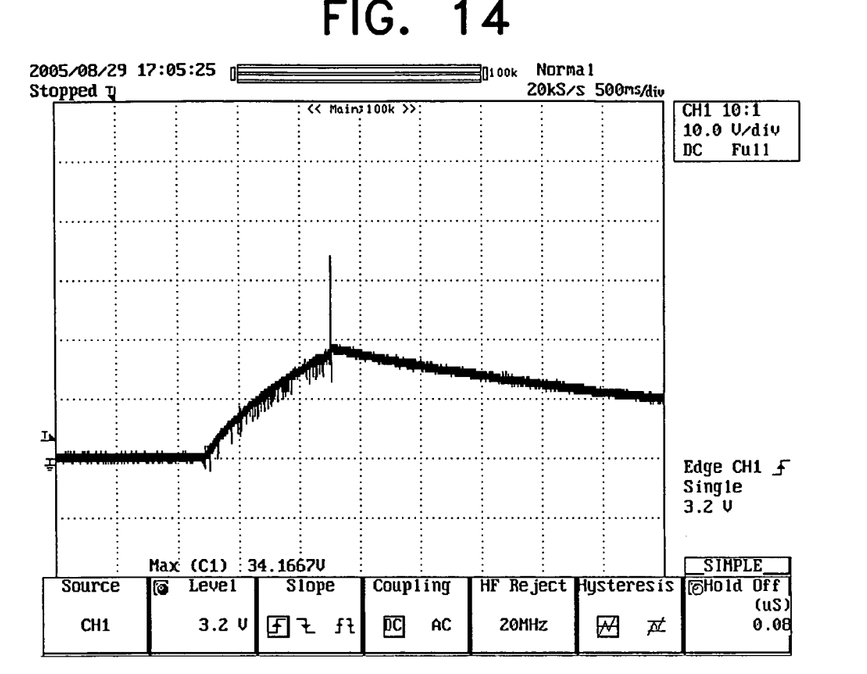
FIG. 14 is a wave-form of lamp tube leakage voltage $V_{C4}$ of the present invention.

When the fluorescent lamp tube leaks or cannot be activated, the output circuit is at a resonant state, $V_E$ (FIG. 10) shall be higher than the voltage in the steady state (FIG. 9). The single-channel comprehensive protection circuit will detect the abnormal signal $V_E$ at A point, said signal is being divided by the first partial pressure resistor $R_1$ and the second partial pressure resistor $R_2$, rectified by the rectifying diode $D_1$, the filter and integral capacitor $C_4$, and the release resistor $R_3$, delayed by the first partial pressure resistor $R_1$ and the filter and integral capacitor $C_4$ (FIG. 14). Then, the executing component will be activated by the diac $D_2$ to achieve the protection.

Figure 11:
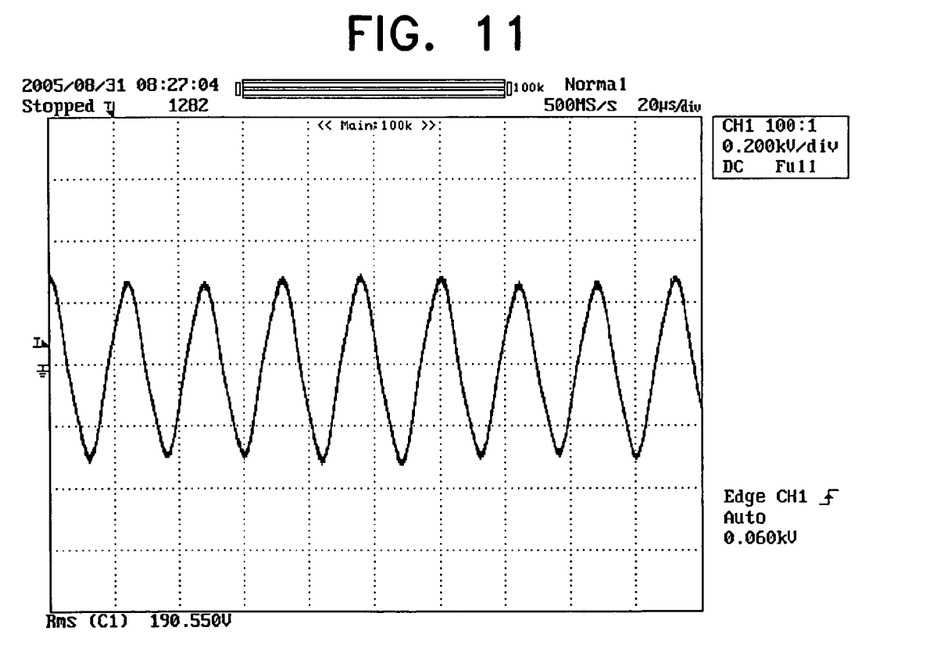
FIG. 11 is a wave-form diagram of lamp tube over-voltage $V_E$ of the present invention.
Figure 15:
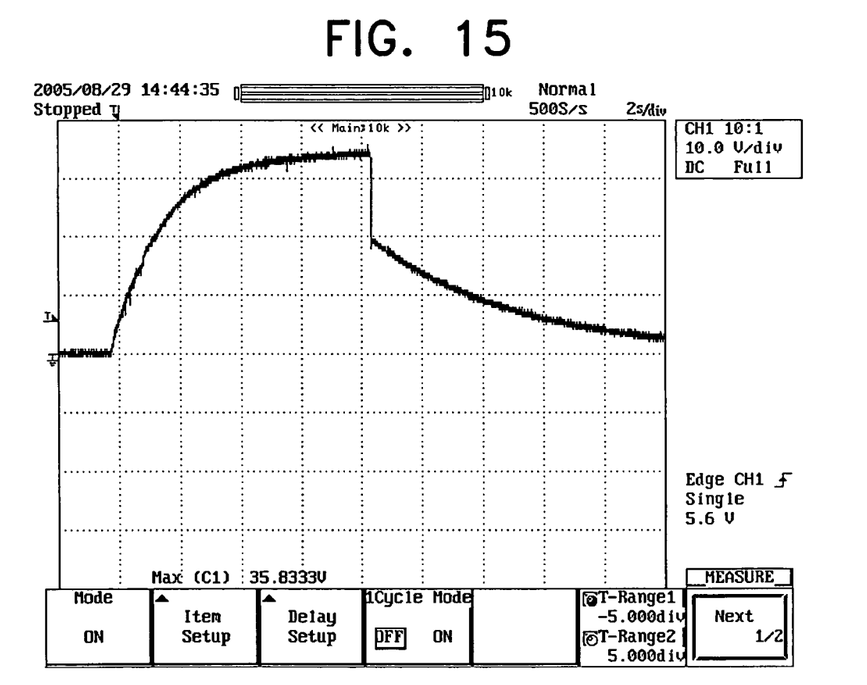
FIG. 15 is a wave-form of lamp tube rectification state or over-voltage $V_{C4}$ of the present invention.

When the fluorescent lamp tube electronic powder symmetrically ages or slowly leaks, the lamp voltage in the output circuit can be slowly increased; $V_E$ (FIG. 11) will be higher than the voltage in the steady state (FIG. 9). After the abnormal signal is divided, rectified and delayed (FIG. 15), the executing component will be activated by the diac $D_2$ to achieve the protection.

Figure 12:
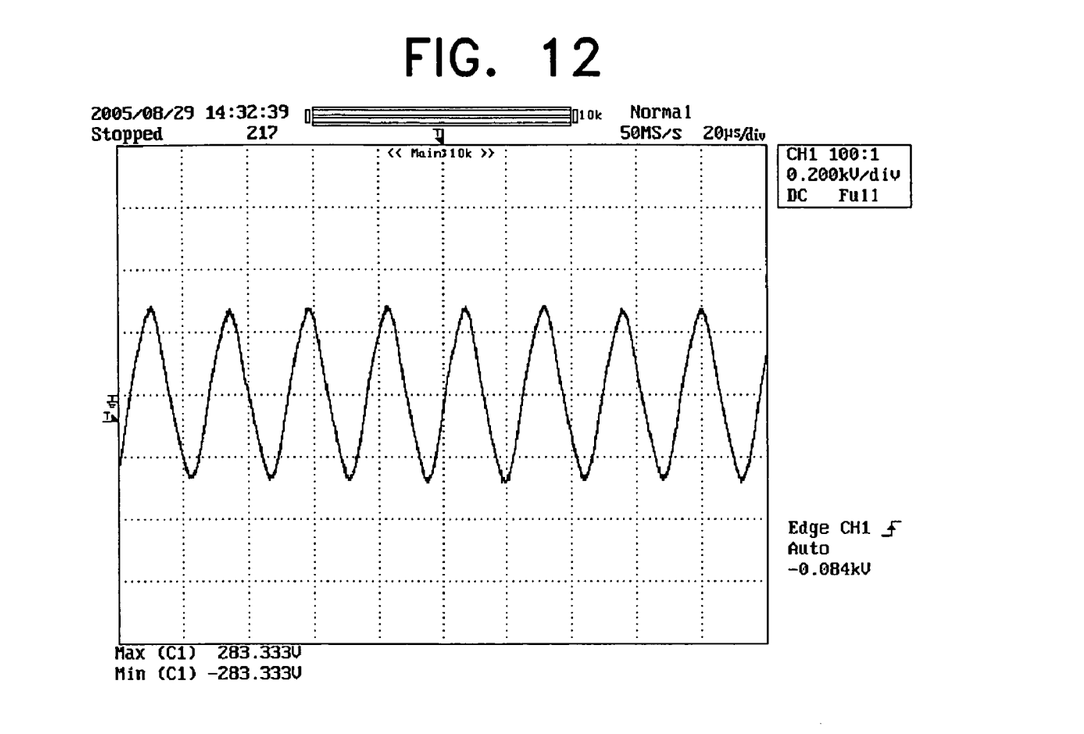
FIG. 12 is a wave-form diagram of reverse lamp tube rectification state voltage $V_E$ of the present invention.
Figure 13:
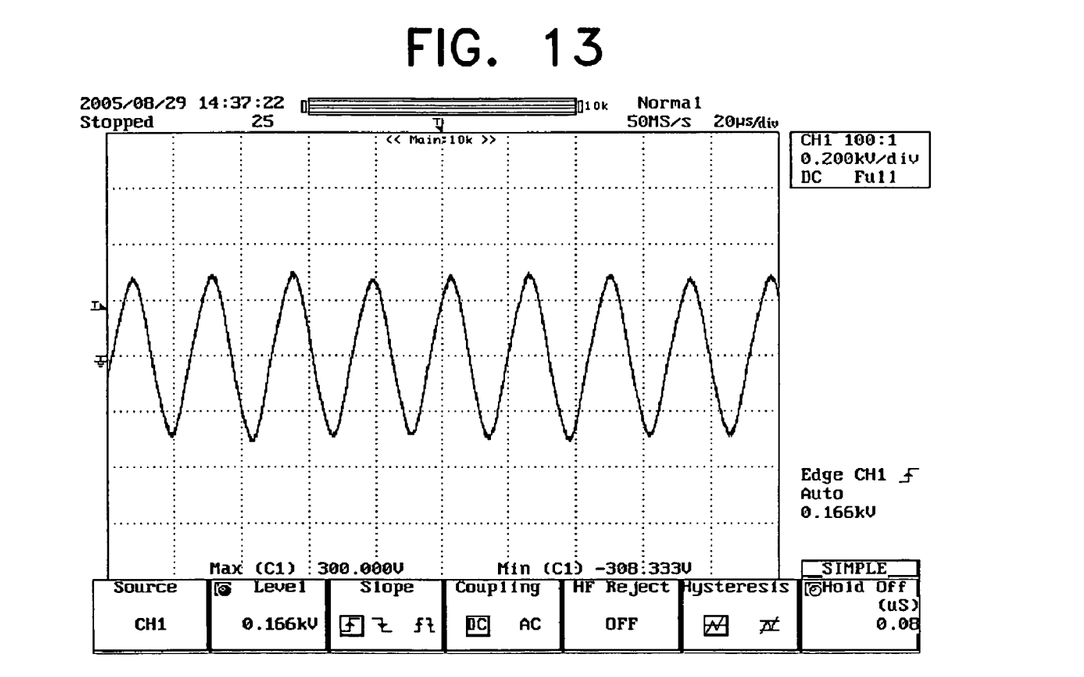
FIG. 13 is a wave-form of forward lamp tube rectification state voltage $V_E$ of the present invention.

When the fluorescent lamp tube appears the end of the lamp life state, $V_C$ can produce an asymmetrical wave, the DC voltage reflected at B point may be moved up and down in a parallel direction. However, after going through the DC block capacitor $C_3$, the abnormal signal $V_E$ (FIGS. 12 and 13) of forward and reverse phases with equal peak and increased peak is obtained. This signal is gradually deepens along with approach of the end of lamp life states and then is slowly higher than the voltage at the steady state (FIG. 9). After the abnormal signal is divided, rectified and delayed (FIG. 15), the execution component will be activated by the diac $D_2$ to achieve the protection.

In summary, because the sampling method of one loading point A at the fluorescent lamp filament (near one end of the resonant inductance L) is used, the present invention integrally processes the abnormal signals for over-current, over-voltage and lamp tube end of lamp life state. The present invention replaces the circuit design of multi-channel and multi-point sampling in the conventional technology, and achieves the objective for simplifying the circuit, reducing the cost and space, increasing the reliability and supporting miniaturization and development of electronic lighting products.

It should be noted that the above-mentioned practice example only describes the present invention, but is not limited to the invention. Any improvement or innovation not exceeding the scope of the substance of the invention shall be deemed as being included in the scope of the present invention.

What is claimed is:

1. A single-channel comprehensive protection circuit for a self-excitation half-bridge series resonant circuit having a single-lamp output, comprising a DC block a capacitor $C_3$, a first partial pressure resistor $R_1$, a second partial pressure resistor $R_2$, a rectifying diode $D_1$, a filter and integral capacitor $C_4$, a release resistor $R_3$, a diac $D_2$, a filter capacitor $C_5$, a filter resistor $R_4$, a thyristor SCR, a clamping diode $D_3$ and a control winding $T_{1D}$;

characterized in that one end of the DC block capacitor $C_3$ is connected with one end of the first partial pressure resistor $R_1$, and the other end of the DC block capacitor is connected with a loading point of one end of a fluorescent lamp filament; the other end of the filament is connected with a resonant inductance L; one end of the second partial pressure resistor $R_2$ is connected with the other end of the first partial pressure resistor $R_1$ and an anode of the rectifying diode $D_1$, and the other end of second partial pressure resistor $R_2$ is connected with a common ground point; a cathode of the rectifying diode $D_1$ is connected with one end of the filter and integral capacitor $C_4$, one end of the release resistor $R_3$, and one end of the diac $D_2$, respectively; the other end of the filter and integral capacitor $C_4$ and the other end of the release resistor $R_3$ are connected with the common ground point; the other end of diac $D_2$ is connected with one end of the filter capacitor $C_5$, one end of the filter resistor $R_4$ and a control pole of the thyristor SCR, respectively; the other end of the filter capacitor $C_5$, the other end of the filter resistor $R_4$, and a cathode of the thyristor SCR are connected with the common ground point; an anode of the thyristor SCR is connected with a cathode of the clamping diode $D_3$, and is connected with an end of a power supply end $V_{DC}$ through a resistor $R_5$; an anode of the clamping diode $D_3$ is connected with one end of the control winding $T_{1D}$ of an oscillatory coil of a self-excitation half-bridge series resonant circuit; and the other end of the control winding $T_{1D}$ is connected with the common ground point.

2. The single-channel comprehensive protection circuit according to claim 1, wherein the control winding $T_{1D}$ is conjugated with the oscillatory winding $T_{1B}$ and $T_{1C}$ of the self-excitation half-bridge series resonant circuit.

3. The single-channel comprehensive protection circuit according to claim 2, wherein the control winding $T_{1D}$ is an auxiliary winding of the oscillatory winding $T_{1B}$ and $T_{1C}$ of the self-excitation half-bridge series resonant circuit.

4. A single-channel comprehensive protection circuit for a self-excitation half-bridge series resonant circuit having a multi-lamp output, comprising a plurality of sampling circuit units of the same structure and their corresponding a plurality of rectifying diodes, each of said plurality of sampling circuit units including a DC block capacitor, and a first partial pressure resistor and a second partial pressure resistor; characterized in that one end of the DC block capacitor is connected with the first partial pressure resistor, and other end of the DC block resistor is connected with a loading point of one end of a fluorescent light filament; the other end of the filament is connected with a resonant inductance; one end of the second partial pressure resistor is connected with the other end of the first partial pressure resistor and an anode of a corresponding rectifying diode; the other end of the second partial pressure resistor is connected with a common ground point; a cathode of the rectifying diode is connected with one end of a filter and integral capacitor $C_4$, one end of a release resistor $R_3$, and one end of a diac $D_2$, respectively; the other end of the filter and integral capacitor $C_4$, and the other end of the release resistor $R_3$ is connected with the common ground point; the other end of the diac $D_2$ is connected with one end of filter capacitor $C_5$, one end of a filter resistor $R_4$, and a control pole of a thyristor SCR, respectively; the other end of the filter capacitor $C_5$, the filter resistor $R_4$, and a cathode of the thyristor SCR are connected with the common ground point; an anode of the thyristor SCR is connected with a cathode of a clamping diode $D_3$, and then is connected with an end of a power supply $V_{DC}$ through a resistor $R_5$; an anode of the clamping diode $D_3$ is connected with one end of a control winding $T_{1D}$ of an oscillatory coil of a self-excitation half-bridge series resonant circuit, and the other end of the control winding $T_{1D}$ is connected with the common ground point.

5. The single-channel comprehensive protection circuit according to claim 4, wherein the control winding $T_{1D}$ is conjugated with the oscillatory winding $T_{1B}$ and $T_{1C}$ of the self-excitation half-bridge series resonant circuit.

6. The single-channel comprehensive protection circuit according to claim 5, wherein the control winding $T_{1D}$ is an auxiliary winding of the oscillatory winding $T_{1B}$ and $T_{1C}$ of the self-excitation half-bridge series resonant circuit.

7. A single-channel comprehensive protection circuit for a separate-excitation half-bridge series resonant circuit having a single lamp output, comprising a DC block capacitor $C_3$, a first partial pressure resistor $R_1$, a second partial pressure resistor $R_2$, a rectifying diode $D_1$, a filter and integral capacitor $C_4$, a release resistor $R_3$, a diac $D_2$, a filter capacitor $C_5$ and a filter resistor $R_4$; characterized in that one end of the DC block capacitor $C_3$ is connected with one end of the first partial pressure resistor $R_1$, and the other end of the DC block capacitor is connected with a loading point of one end of a fluorescent light filament; the other end of the filament is connected with a resonant inductance L; one end of the second partial pressure resistor $R_2$ is connected with the other end of the first partial pressure resistor $R_1$ and an anode of the rectifying diode $D_1$ and the other end of the second partial pressure resistor $R_2$ is connected with a common ground point; a cathode of the rectifying diode $D_1$ is connected with one end of the filter and integral capacitor $C_4$, one end of the release resistor $R_3$, and one end of the diac $D_2$, respectively; the other end of the filter and integral capacitor $C_4$ and the other end of the release resistor $R_3$ are connected with the common ground point; the other end of the diac $D_2$ is connected with one end of the filter capacitor $C_5$, one end of the filter resistor $R_4$, and a selected end CS of a drive chip of the separate-excitation half-bridge series resonant circuit, respectively; and the other end of filter capacitor $C_5$ and the other end of the filter resistor $R_4$ are connected with the common ground point.

8. The single-channel comprehensive protection circuit according to claim 7, characterized in that the drive chip stops the oscillatory output when the electric potential to the common ground point of the selected end CS of drive chip IC is higher than 0.6V.

9. A single-channel comprehensive protection circuit for a separate-excitation half-bridge series resonant circuit having a multiple-lamp output, comprising a plurality of sampling circuit units of the same structure and their corresponding a plurality of rectifying diodes; each of said plurality of sampling circuit units including a DC block capacitor, a first partial pressure resistor and a second partial pressure resistor; characterized in that one end of the DC block capacitor is connected with the first partial pressure resistor, and the other end of the DC block capacitor is connected with a loading point of one end of a fluorescent lamp filament; the other end of the filament is connected with a resonant inductance; one end of the second partial pressure resistor is connected with the other end of the first partial pressure resistor and an anode of a corresponding rectifying diode; the other end of the second partial pressure resistor is connected with a common ground point; a cathode of the rectifying diode is connected with one end of a filter and integral capacitor $C_4$, one end of a release resistor $R_3$, one end of a diac $D_2$, respectively; the other end of the filter and integral capacitor $C_4$, and other end of the release resistor $R_3$ are connected with the common ground point; the other end of the diac $D_2$ is connected with one end of a filter capacitor $C_5$, one end of a filter resistor $R_4$, and a selected end SC of a drive chip for the separate-excitation half-bridge series resonant circuit, respectively; and the other end of the filter capacitor $C_5$ and the filter resistor $R_4$ are connected with the common ground point.

\* \* \* \* \*